(12) United States Patent
De Meno et al.

(10) Patent No.: US 7,937,702 B2
(45) Date of Patent: *May 3, 2011

(54) STORAGE OF APPLICATION SPECIFIC PROFILES CORRELATING TO DOCUMENT VERSIONS

(75) Inventors: Randy De Meno, Staten Island, NY (US); Jeremy A. Schwartz, Red Bank, NJ (US); Anand Prahlad, East Brunswick, NJ (US); James J. McGuigan, Avon, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 255 days.

This patent is subject to a terminal disclaimer.

(21) Appl. No.: 12/200,666

(22) Filed: Aug. 28, 2008

(65) Prior Publication Data

US 2008/0320032 A1    Dec. 25, 2008

Related U.S. Application Data

(63) Continuation of application No. 09/882,438, filed on Jun. 14, 2001, now Pat. No. 7,434,219, which is a continuation-in-part of application No. 09/774,272, filed on Jan. 30, 2001, now Pat. No. 7,155,481.

(60) Provisional application No. 60/179,343, filed on Jan. 31, 2000.

(51) Int. Cl.
*G06F 9/46* (2006.01)
*G06F 17/30* (2006.01)
*G06F 17/00* (2006.01)
*G06F 15/16* (2006.01)

(52) U.S. Cl. ........ 718/100; 715/500; 715/511; 715/522; 707/999.2; 707/999.201; 707/999.202; 709/201; 709/246

(58) Field of Classification Search ........................ None
See application file for complete search history.

(56) References Cited

U.S. PATENT DOCUMENTS

| 4,686,620 A | 8/1987 | Ng |
| 4,995,035 A | 2/1991 | Cole et al. |

(Continued)

FOREIGN PATENT DOCUMENTS

EP    0259912    3/1988

(Continued)

OTHER PUBLICATIONS

Armstead et al., "Implementation of a Campus-wide Distributed Mass Storage Service: The Dream vs. Reality," *IEEE*, 1995, pp. 190-199.

(Continued)

*Primary Examiner* — Jennifer N To
(74) *Attorney, Agent, or Firm* — Perkins Coie LLP

(57) ABSTRACT

A computer system that includes a processor for operating a software application in the computer system. The software application provides for creation, storage, and retrieval of a file, the file having a corresponding profile that the software application uses for at least the purpose of preparing the software application to display the file upon its retrieval by the software application. Also included is a plurality of storage media that are communicatively coupled to the processor. A storage management module distributes stored files and their accompanying profiles among the plurality of storage media according to predetermined patterns. One of such predetermined patterns is separate storage of a file and the file's corresponding profile.

13 Claims, 11 Drawing Sheets

U.S. PATENT DOCUMENTS

| | | |
|---|---|---|
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi et al. |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,613,134 A | 3/1997 | Lucus et al. |
| 5,619,644 A | 4/1997 | Crockett et al. |
| 5,638,509 A | 6/1997 | Dunphy et al. |
| 5,673,381 A | 9/1997 | Huai et al. |
| 5,699,361 A | 12/1997 | Ding et al. |
| 5,729,743 A | 3/1998 | Squibb |
| 5,740,405 A | 4/1998 | DeGraaf |
| 5,751,997 A | 5/1998 | Kullick et al. |
| 5,758,359 A | 5/1998 | Saxon |
| 5,758,649 A | 6/1998 | Iwashita et al. |
| 5,761,677 A | 6/1998 | Senator et al. |
| 5,764,972 A | 6/1998 | Crouse et al. |
| 5,778,395 A | 7/1998 | Whiting et al. |
| 5,812,398 A | 9/1998 | Nielsen |
| 5,813,009 A | 9/1998 | Johnson et al. |
| 5,813,017 A | 9/1998 | Morris |
| 5,860,073 A | 1/1999 | Ferrel et al. |
| 5,875,478 A | 2/1999 | Blumenau |
| 5,887,134 A | 3/1999 | Ebrahim |
| 5,896,531 A | 4/1999 | Curtis et al. |
| 5,901,327 A | 5/1999 | Ofek |
| 5,924,102 A | 7/1999 | Perks |
| 5,950,205 A | 9/1999 | Aviani, Jr. |
| 5,974,563 A | 10/1999 | Beeler, Jr. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,091,518 A | 7/2000 | Anabuki et al. |
| 6,094,416 A | 7/2000 | Ying |
| 6,108,712 A | 8/2000 | Hayes, Jr. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,167,402 A | 12/2000 | Yeager |
| 6,212,512 B1 | 4/2001 | Barney et al. |
| 6,253,217 B1 | 6/2001 | Dourish et al. |
| 6,260,069 B1 | 7/2001 | Anglin |
| 6,269,431 B1 | 7/2001 | Dunham |
| 6,275,953 B1 | 8/2001 | Vahalia et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,287 B1 | 1/2002 | Kumar et al. |
| 6,343,324 B1 | 1/2002 | Hubis et al. |
| RE37,601 E | 3/2002 | Eastridge et al. |
| 6,356,801 B1 | 3/2002 | Goodman et al. |
| 6,389,432 B1 | 5/2002 | Pothapragada et al. |
| 6,421,711 B1 | 7/2002 | Blumenau et al. |
| 6,470,332 B1 | 10/2002 | Weschler |
| 6,487,561 B1 | 11/2002 | Ofek et al. |
| 6,519,679 B2 | 2/2003 | Devireddy et al. |
| 6,538,669 B1 | 3/2003 | Lagueux, Jr. et al. |
| 6,549,918 B1 | 4/2003 | Probert, Jr. et al. |
| 6,557,039 B1 | 4/2003 | Leong et al. |
| 6,564,228 B1 | 5/2003 | O'Connor |
| 6,593,656 B2 | 7/2003 | Ahn et al. |
| 6,658,526 B2 | 12/2003 | Nguyen et al. |
| 7,039,860 B1 | 5/2006 | Gautestad et al. |
| 2001/0047381 A1 | 11/2001 | Meno et al. |
| 2003/0050979 A1* | 3/2003 | Takahashi ............ 709/204 |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0899662 | 3/1999 |
| EP | 0981090 | 2/2000 |
| EP | 0986011 | 3/2000 |
| WO | WO-95/13580 | 5/1995 |
| WO | WO-99/12098 | 3/1999 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE Computer*, vol. 21, No. 6, pp. 11-22 (1988) (see particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

\* cited by examiner

Storage Sequences

| Storage Name | 1st Storage ID | Duration (weeks) | 2nd Storage ID | Duration (weeks) | 3rd Storage ID | Duration (weeks) | ... | Nth Storage ID |
|---|---|---|---|---|---|---|---|---|
| Primary | 001 | 13 | 005 | 26 | 002 | 52 | | 004 |
| Secondary | 005 | 13 | 003 | 13 | 002 | 65 | | 004 |
| Duplicate | 001 | 13 | | | | | | |
| | 005 | 39 | 002 | 26 | | | | 004 |
| Long Term | 005 | 2 | 002 | 12 | | | | 004 |

Fig. 6

STORAGE OF APPLICATION SPECIFIC PROFILES CORRELATING TO DOCUMENT VERSIONS

CROSS-REFERENCE TO RELATED APPLICATIONS

This application is a continuation of U.S. patent application Ser. No. 09/882,438, entitled "Storage of Application Specific Profiles Correlating to Document Versions," filed Jun. 14, 2001, now U.S. Pat. No. 7,434,219 which is a continuation-in-part of U.S. patent application Ser. No. 09/774,272, entitled "Email Attachment Management In A Computer System," filed Jan. 30, 2001, now U.S. Pat. No. 7,155,481, which claims the benefit of U.S. Provisional Application Ser. No. 60/179,343, entitled "Logical View With Granular Access to Exchange Data Managed by Modular Data and Storage Management Systems," filed Jan. 31, 2000, all of which are incorporated by reference herein in their entireties.

BACKGROUND

1. Field of the Invention

The present invention relates to storage and retrieval configurations in a computer system, in particular to storage of application specific profiles that correlate to various document versions of an application and retrieval of the same.

2. Description of the Related Art

Typical storage and retrieval configurations in a computer system provide a user with resources to store digital files such as word processing files, email files, etc., and to retrieve the digital files when desired. These digital files of the computer system are commonly backed up to a new location on the computer system itself or even to a completely different and separate storage facility such as a magnetic tape, a different disk drive, etc. Backing up digital files provides an alternate source(s) to access the digital files when the digital files have become corrupted, lost, written over, no longer accessible due to hardware failure, etc. Retrieving or storing a digital file in this manner may consume inordinate amounts of time, especially when the file was stored in a location such as a magnetic tape.

Many other problems and disadvantages of the prior art will become apparent to one skilled in the art after comparing such prior art with the present invention as described herein.

SUMMARY OF THE INVENTION

Various aspects of the present invention may be realized through a computer system that includes a processor for operating a software application in the computer system. The software application provides for creation, storage, and retrieval of a file, the file having a corresponding profile that the software application uses for at least the purpose of preparing the software application to display the file upon its retrieval by the software application. Also included is a plurality of storage media that are communicatively coupled to the processor. A storage management module distributes stored files and their accompanying profiles among the plurality of storage media according to predetermined patterns. One of such predetermined patterns is separate storage of a file and the file's corresponding profile.

The computer system may have at least one of the plurality of storage media located locally, or on the other hand located remotely, or even both locally and remotely. The separate storage by the storage management module in the computer system is configured to provide more rapid retrieval of the application specific profile than of the file associated with the application specific profile. The profiles that are stored among the plurality of storage media often include different profiles for different versions of a corresponding file. In some embodiments of the present invention, the storage management module provides concurrent access of the profile and the file. The profile is typically retrieved prior to the file and sets up the software application in preparation for receipt of the file.

Various aspects of the present invention may also be realized through an application specific profile storage and retrieval system that includes at least a software application that creates files with corresponding profiles specific to the software application and each of the files that are created. The software application is operable by a processor and a plurality of storage media are selectively used by the processor to store the application specific profiles separately from the files. A storage management module is included that is operable by the processor and that manages storage of the application specific profiles and the files such that application specific profiles may be retrieved separately from the corresponding file itself. The application specific profile storage and retrieval system may have many variations, including variations such as listed in relation to the computer system described above.

A method for storage and retrieval in a computer system according to principles of the present invention may also be realized by, not necessarily in the following order, creating a file with a software application that creates a corresponding profile that accompanies the file with each access of the file, a new profile being created at least each time the file is saved; sending the file, with the software application, to a storage management module that manages storage of the file with its accompanying profile; storing the file and its accompanying profile to separate storage locations in the computer system; requesting for the retrieval of the file with the software application such that the storage management module retrieves the file with its accompanying profile as though the file and its accompanying profile were located in a single position; and formatting the software application with the retrieved profile prior to display of the file with the software application.

The method may require that the software application is selected from the group consisting of a word processor, an engineering graphics program, a standard graphics program, and a web browser. Further, a different profile is commonly stored with the storage of each version of the file as the file is created. Finally, the storage management module typically distributes different files and versions of those files in a first set of storage media and stores different profiles for each of the files and version of those files in a second set of storage media.

Other aspects of the present invention will become apparent with further reference to the drawings and specification which follow.

BRIEF DESCRIPTION OF THE DRAWINGS

A better understanding of the present invention can be obtained when the following detailed description of the drawings is considered in conjunction with the following drawings.

FIG. 6 is a block diagram of exemplary storage sequences such as may be found in FIG. 5.

DETAILED DESCRIPTION OF THE DRAWINGS

Figure 1:
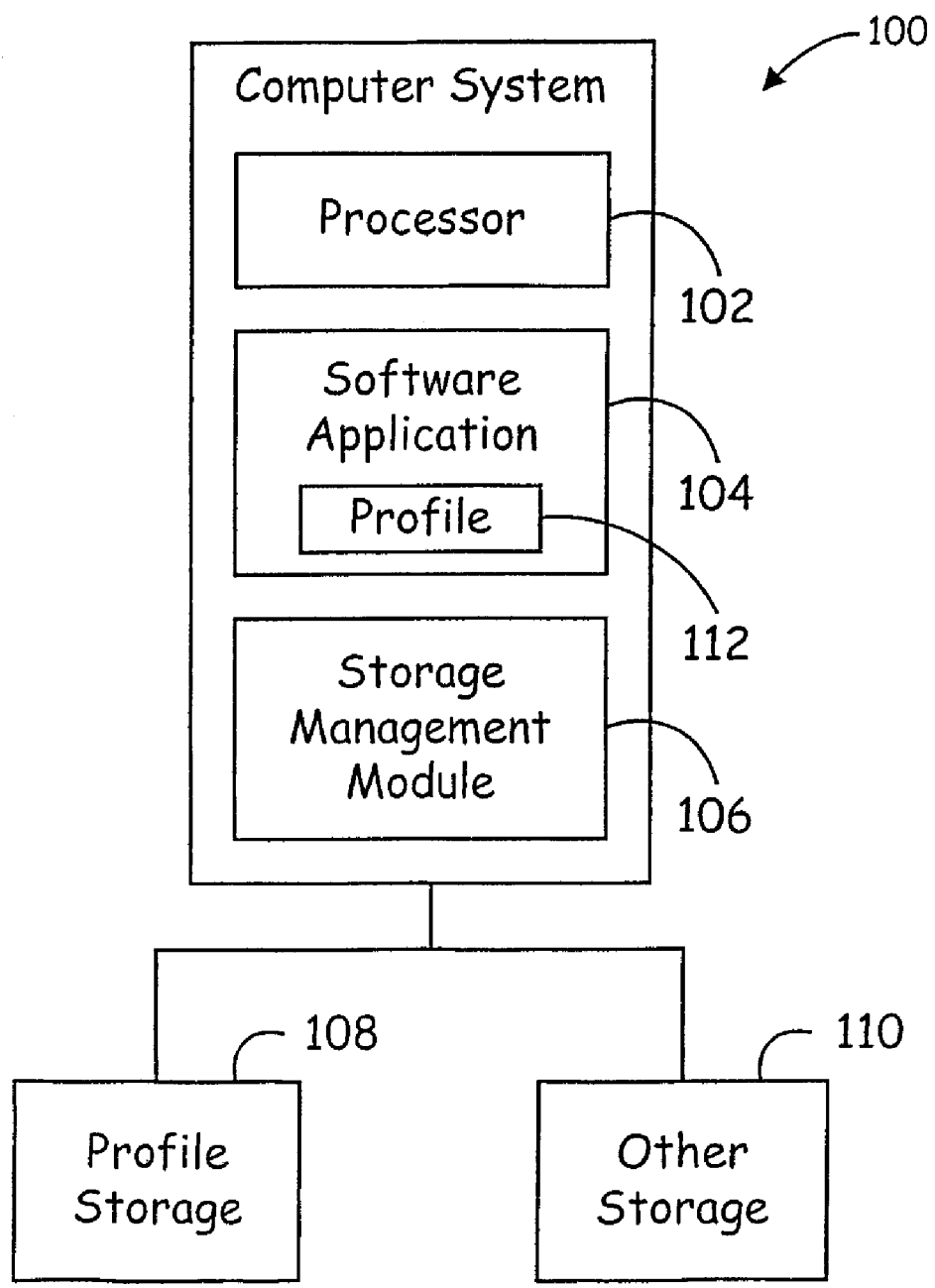
FIG. 1 is a block diagram of an exemplary computer system that provides separate storage of files that are created by a software application and profiles that accompany different versions of each of the files that are created by the software application.

FIG. 1 is a block diagram of an exemplary computer system 100 that provides separate storage of files (digital documents, graphics files, data compilations, etc., herein referred to as "files") that are created by a software application and profiles that accompany different versions of the files that are created. The computer system 100 includes a processor 102 that is used to operate a software application 104 that creates the files that are stored for later retrieval. The computer system 100 incorporates a storage management module 106 to organize the file storage. For ease of understanding, the computer system 100 is illustrated as having two separate storage locations, i.e., a profile storage 108 and an other storage 110. The profile storage 108 is designed for quick access of profile data by the storage management module 106, the data that is stored therein being different profiles 112 that are generated during use of the software application 104 and saved when different versions of the file of the software application 104 are saved. Although each of the following figures refer only to storage or retrieval systems, it is to be understood that the embodiments of the figures apply to both storage and retrieval.

The software application 104 could be any number of applications such as a word processor, a graphic design program, a web browser, etc., as long as the software application 104 has a profile 112 corresponding to files that are created or edited with the software program 104. The profile 112 contains different settings that are used during editing of the file with the software program 104. For example, when the software program 104 is a word processor such as Microsoft Word, a profile may contain numerous settings, such as a setting to prevent "Autocorrecting" (i.e., automatic correcting of certain misspelled text such as automatically transposing the "t" and the "h" in the three letter string "hte"), or a setting that contains various "bookmarks" of a file (i.e., a transparent location marker for quickly moving to a specific location in a document). The profile 112 may periodically change as a file is edited by the software application 104, but when the file is saved and editing is discontinued, the most recently used profile is saved with the file so that upon retrieval of the file at a later date the software application 104 will have a profile that is familiar to the last user and editing may continue at the same point that it ended on. Of course, the profile 112 retrieval and set up adds processing time to the computer system 100 when a file is retrieved. Advantageously, the storage management module 106 is configured to retrieve the profile 112 from the profile storage 108 concurrently with retrieval of the file from the other storage 110. In this manner, oftentimes the profile 112 is set up in the software application 104 prior to retrieval of the file from the other storage 110 and the delay in the profile 112 set up does not cause further delay in file retrieval.

The storage management module 106 may be a single module or a distributed computing system and, although illustrated as being either a storage or a retrieval module in the following figures, operates as both a storage and retrieval module. When operating as a retrieval module, the software application 104 has immediate access to the profile 112 regardless of the location of the file that is being retrieved from the other storage 110 by the software application 104. As stated, this immediate access of the profile 112 is advantageous, among other reasons, because the software application 104 is given time to set up while the requested file is being retrieved rather than performing set up after the requested file is finally retrieved. In other words, user specific settings for a particular file are immediately available to the software application 104 regardless of the file or version of the file that is being retrieved.

Concurrent access of the profile 112 from the profile storage 108 and the corresponding file data from the other storage 110 allows the software application 104 to be set up with user specific settings while the file is being retrieved. In this manner, when the file of the other storage 110 is viewed, the file has a familiar look to the most recent user, e.g., the user that has requested it. Of course, separate retrieval of the profile 112 requires separate storage of the same and as will be apparent and understood in the accompanying descriptions of the illustrated embodiments.

Figure 2:
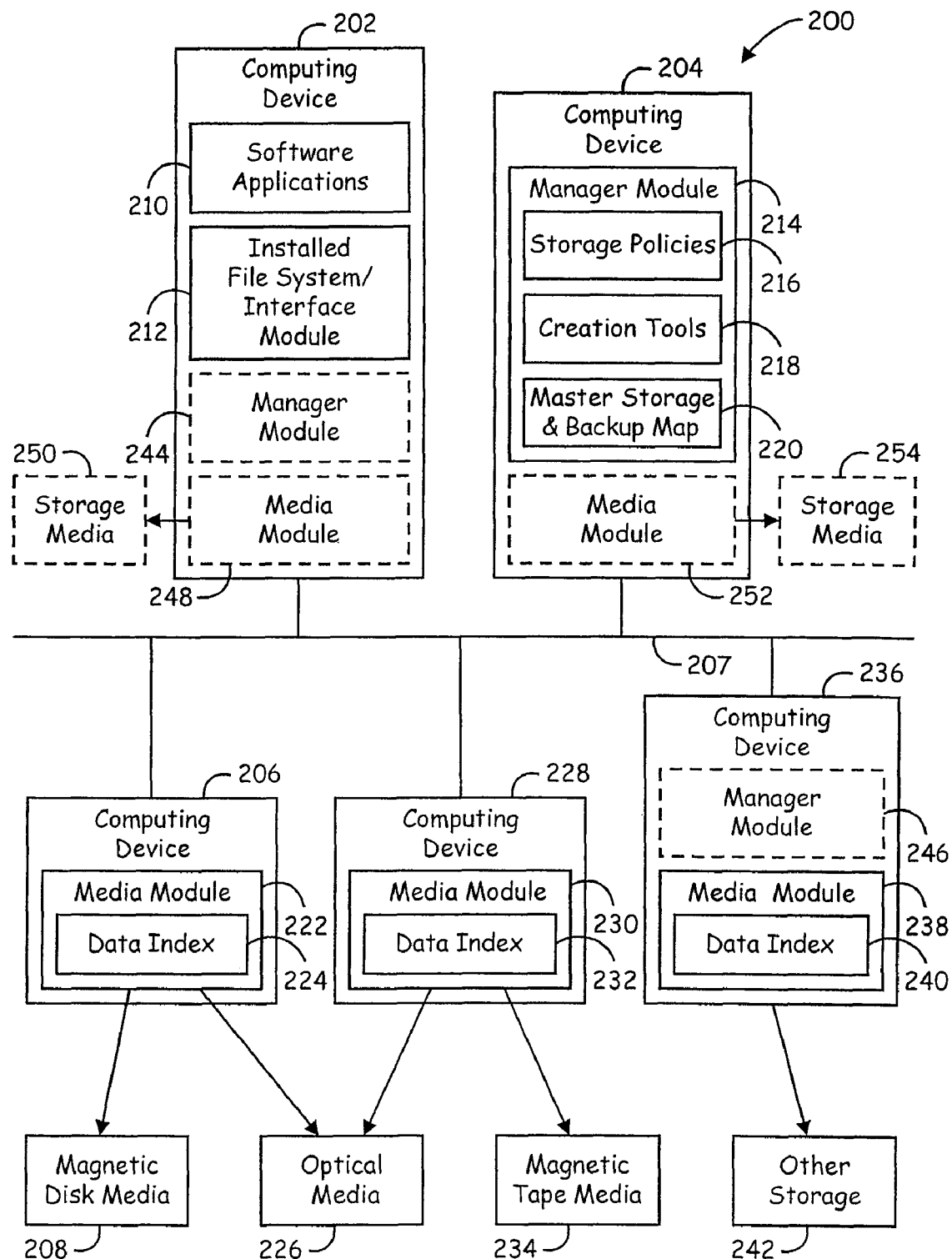
FIG. 2 is a block diagram of an exemplary storage system that is illustrated in greater detail than the computer system of FIG. 1.

FIG. 2 is a block diagram of an exemplary storage system 200 that is illustrated in greater detail than the computer system 100. The storage system 200 includes a computing device 202, a computing device 204, and a computing device 206 that are interconnected and communicate with one another on a network 207, such as an ethernet network. The computing device 206 includes magnetic disc media 208 for storage of data that the computing device 206 receives from the computing device 202.

The computing device 202 includes software applications 210 and installed file system 212. When data is to be stored from the software application 210, the installed file system 212 begins interacting with a manager module 214 of the computing device 204. The manager module 214 includes storage policies 216, creation tools 218, and a master storage and backup map 220. In this embodiment, when the software application 210 is directed to store data, the data is sent to the installed file system and then the manager module 214 examines the storage policies 216 to determine the appropriate location for storage of the data and the accompanying profile. The master map 220 includes further information for directing the data to be sent to the computing device 206 where a media module 222 receives the data and the data is then stored in the appropriate storage media. A data index 224 in the media module 222 contains still further information regarding the location to store the data. From computing device 206, the data may be stored in the magnetic disc media 208 or an optical media 226.

The master storage and backup map 220 may direct the data to be stored in a computing device 228, rather than the computing device 206. In the event that data is to be stored in the computing device 228, a media module 230 determines exactly where the data is to be stored and updates a data index 232 when the data is stored in one of the storage media such as the optical media 226 or a magnetic tape media 234.

The master storage and backup map 220 could also send the data to a computing device 236 where a media module 238 determines that the data will be placed at a different location and this information is updated in a data index 240 before the data is finally sent to other storage 242.

As illustrated in FIG. 2, the computing device 202 is used to store data from the software applications 210 in one of multiple storage locations. Of course, the storage media 208, 226, 234, and 242 could be located in other arrangements than as distributed between the computing devices 206, 228, 236. As those skilled in the art will understand upon viewing this disclosure, a manager module does not necessarily have to be located in the computing device 204, but, as illustrated in dashed lines, a manager module 244 could replace or supplement the manager module 214. Likewise, a manager module 246 illustrated in dashed lines could also replace or supplement the other manager modules 214 and 244. The media modules 222, 230, and 238 could also be supplemented with a media module 248 shown in dashed lines that would interact with an additional storage media 250, also illustrated in dashed lines. Further as illustrated in dashed lines, the computing device 204 could include a media module 252 that interacts with a storage media 254.

Figure 3:
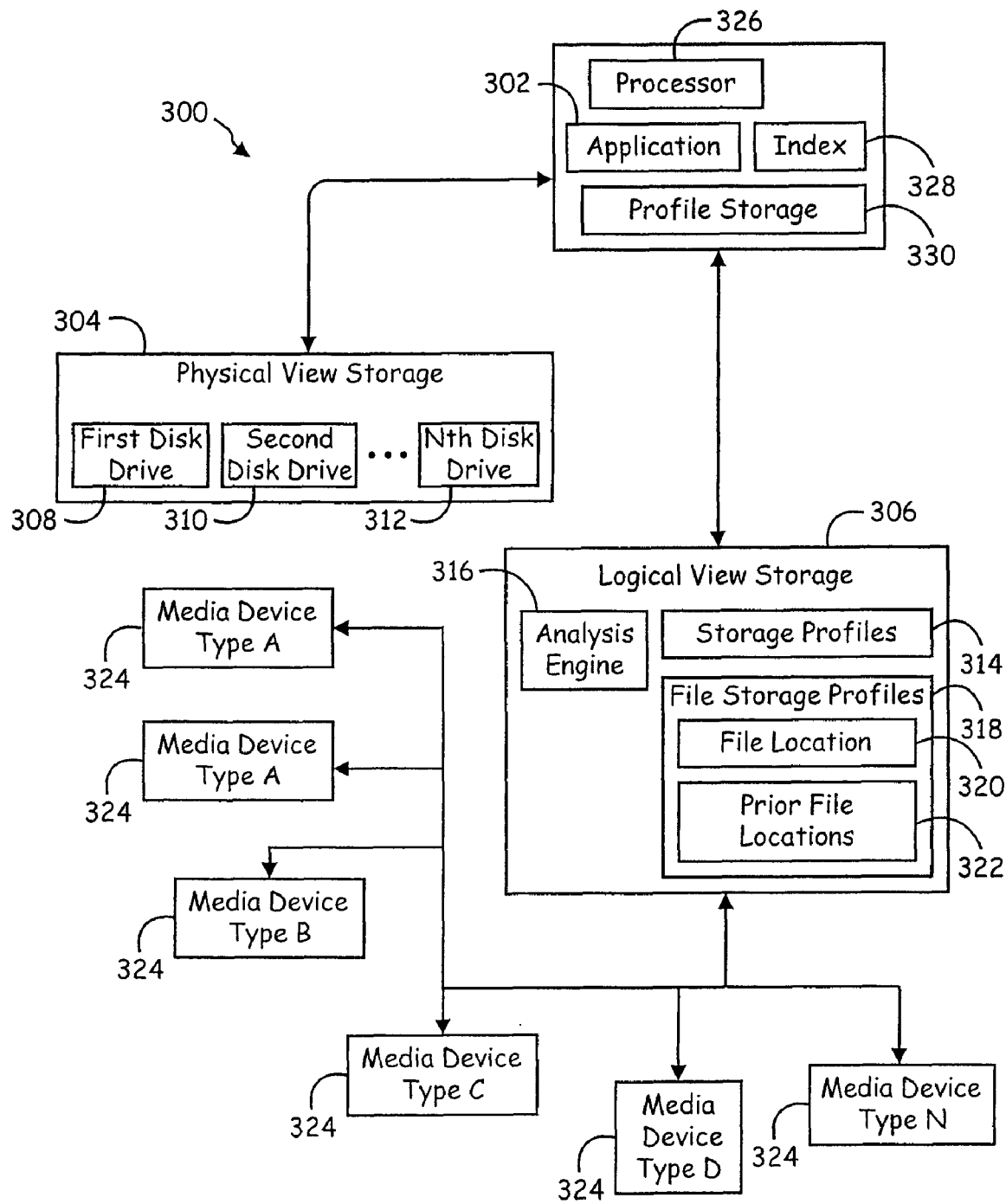
FIG. 3 is a block diagram of an exemplary computer system for providing separate storage locations for a file of a software application and the application specific profiles of the file according to principles of the present invention.

FIG. 3 is a block diagram of an exemplary computer system 300 for providing separate storage locations for a file of a software application and the application specific profiles of the file according to principles of the present invention. The computer system 300 is illustrated as an application 302 with a physical view storage 304. A logical view storage 306 provides an organizational scheme for accessing different documents/data in the computer system 300. For example, the application 302 could be a word processor that access the physical view storage 304 and access documents that have been stored on any one of a first disk drive 308, a second disk drive 310, etc., down to an Nth disk drive 312. The application 302 could also access information through the logical view storage 306 from any one of a variety of media devices.

The logical view storage 306 provides the organizational scheme for storage and retrieval of information that is used in the computer system 300. Storage policies 314 are used to determine where and how particular information is to be stored. An analysis engine 316 is used to analyze the particular information that is being stored or retrieved, and based upon at least the information's storage policy and a file storage history 318, the analysis engine 316 determines the current location of the information of interest, either where to store the information or where to access the information. The file storage history 318 includes information such as a file location 320 and prior file locations 322. With the assistance of the analysis engine 316, the logical view storage 306 balances information storage among media devices (Type A, B, C, D, . . . N) 324 according to multiple factors such as factors that are found in the storage policies 314 and the file storage history 318.

Factors include things such as how different users of the application 302 are treated for file storage access, i.e., one user has initial storage of documents in media device type A while another user has initial storage of documents in media device type B. The first user may have documents migrate from media device type A to B after a week and then from B to C after a month. The second user may only have documents migrate from media device type B to C after a month. The different storage variations are as varied as the different types of users that may use the application 302.

Another factor that could influence the organizational scheme of the logical view storage 306 is the type of application 302 that is storing or retrieving the information. For example, word processing applications may have a completely different storage scheme than spreadsheet or engineering drawing applications. Different applications may also access information at different frequencies, require different access times, perform editing or only viewing, etc., all of which could influence the organizational scheme of the logical view storage 306. The different media types 324 offer, among other things, different access times to accommodate the differing types of application 302.

The application 302 operates by means of a processor 326. The processor creates an index 328 to track storage of various profiles that are created to accompany files that are accessed in the application 302. For example, if the application 302 is a word processor and a new document is created, upon storage of the new document the index 328 will be updated for ease of tracking the storage location of the profile regardless of the logical view storage 306 determination of where the new document is to be stored. In this manner, the profile may be retrieved concurrently with a request for retrieval of the new document and the application 302 is able to be set up prior to receiving the new document, thereby expediting the time spent waiting for the new document to be accessible in the application 302. Various profiles specific to versions of the new document are stored in a profile storage 330 along with profiles from other applications and other versions of other documents or files. Of course, those skilled in the art and viewing the present disclosure will understand that variations exist in the tools that are used to retrieve different files with their accompanying profiles.

Figure 4:
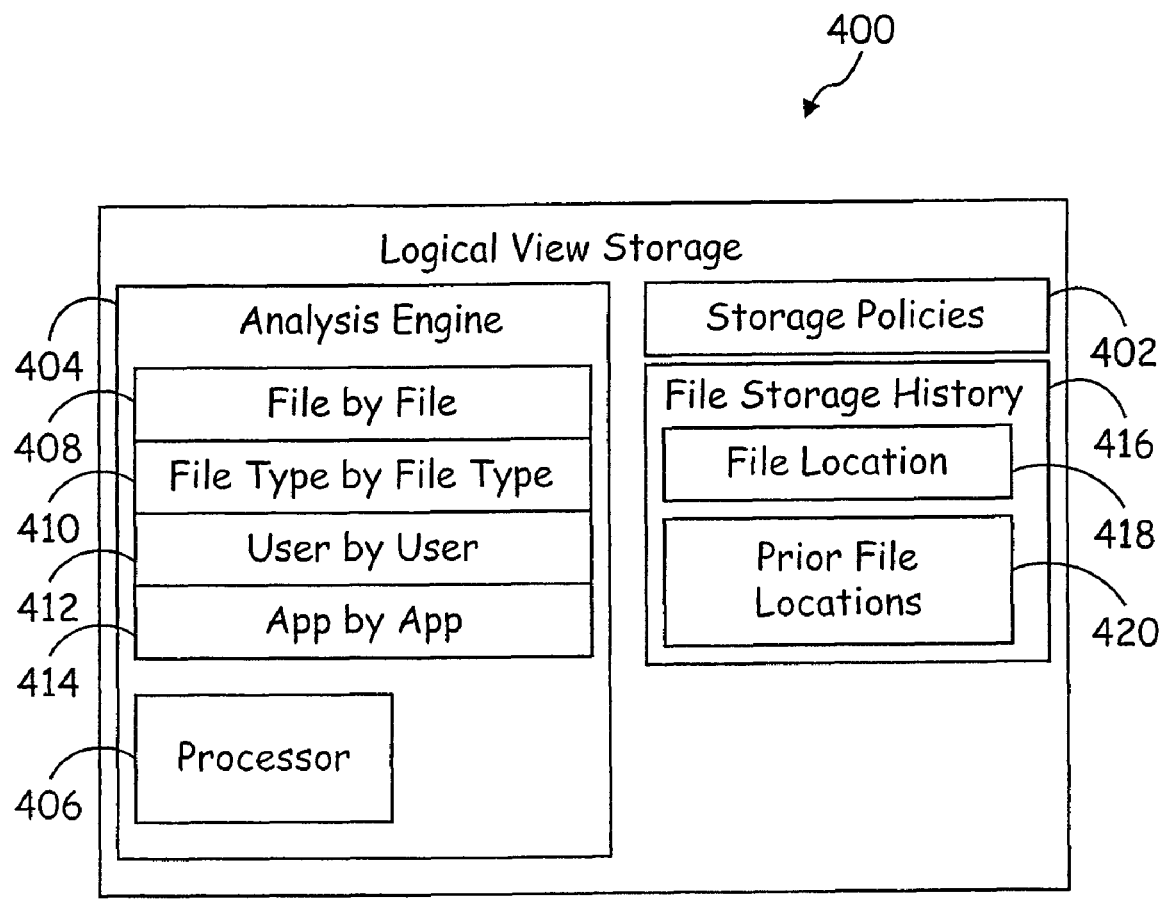
FIG. 4 is a block diagram of an exemplary logical view storage that may be used in the computer system of FIG. 3.

FIG. 4 is a block diagram of an exemplary logical view storage 400 that may be used in the computer system 300. The logical view storage 400 includes storage policies 402 and an analysis engine 404. The analysis engine 404 includes a processor 406 that determines storage and retrieval information based the storage policies 402 and certain other characteristics such as "file by file" 408, "file type by file type" 410, "user by user" 412, "app by app" 414, etc.

The storage policies 402 are used to determine where and how particular information is to be stored. The analysis engine 404 is used to analyze the particular information that is being stored or retrieved, and based upon at least the information's storage policy and a file storage history 416, the analysis engine 404 determines the current location of the information of interest, either where to store the information or where to access the information. The file storage history 416 includes information such as a file location 418 and prior file locations 420.

Figure 5:
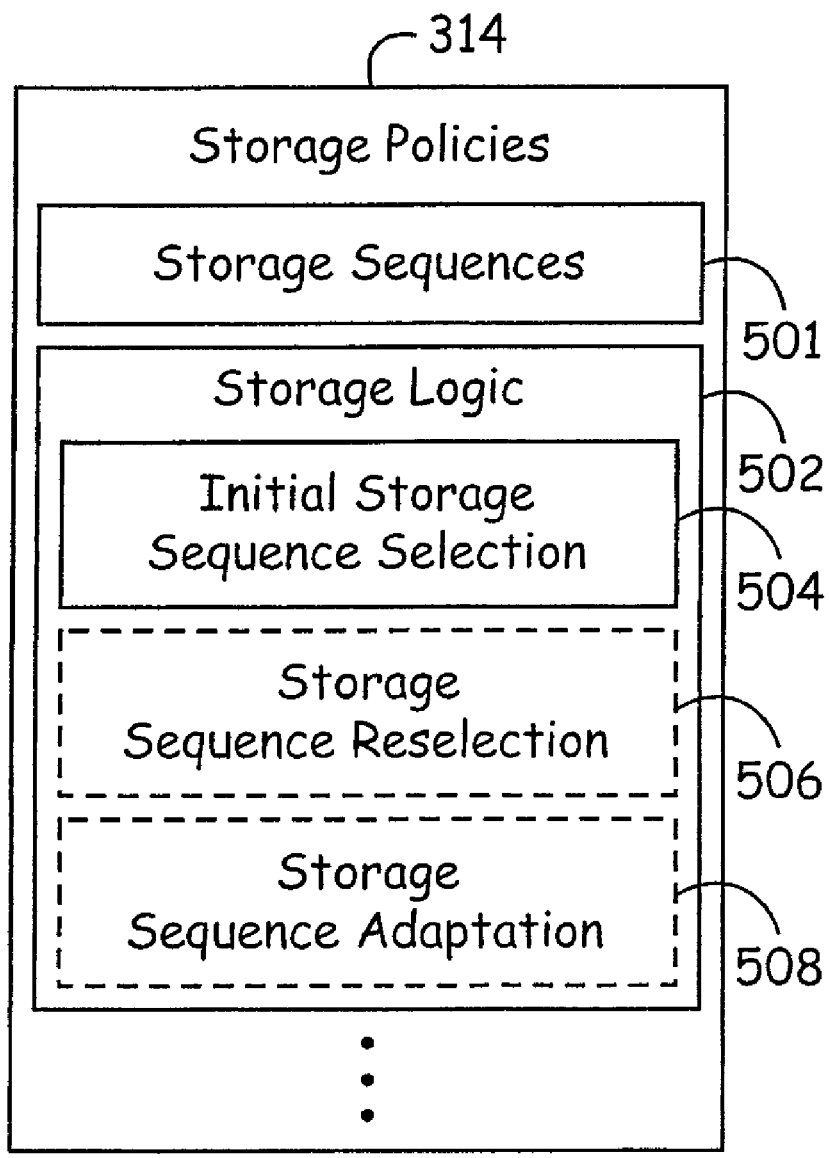
FIG. 5 is a block diagram of exemplary storage policies which may be found in the embodiments of FIGS. 3 and 4.

FIG. 5 is a block diagram of exemplary storage policies 314. The storage policies 314 include storage sequences 501 and storage logic 502. The storage sequences 501 represent potential storage patterns which may be used to store particular types of data. The storage logic 502 includes initial storage sequence selection 504, which represents potential storage considerations for the data when it arrives at the analysis engine 316. Represented in dash lines is storage sequence reselection 506 and storage sequence adaptation 508. The storage sequence reselection 506 represents logic which would allow alternative sequence selection logic to be used in place of the initial storage sequence selection 504. Although not required, a storage sequence reselection 506 would occur when the initial storage sequence selection 504 is inappropriate for the data that is being transmitted from the application 302. The storage sequence adaptation 508 represents logic that would enable the initial storage sequence selection 504 to be modified according to changes in the data that is being saved in the storage mechanisms.

FIG. 6 is a block diagram of exemplary storage sequences 501. The storage sequences 501 include a primary storage sequence 602, a secondary storage sequence 604, a duplicate storage sequence 606, and a long term storage sequence 608. It should be noted that these are exemplary storage sequences only, and numerous other storage sequences could be added to the storage sequences 501. The storage sequences 501 are arranged in rows with columns to illustrate the different storage sequence characteristics. The far left column illustrates the storage sequence name followed by a first storage I.D. in the second column. For example, if the application 302 is directing the storage of data, the analysis engine 316 would look to the storage policies 314. A default storage policy may include storing the data to the primary storage sequence 602 where the data would enter the first storage having an I.D. of 001. The data would be stored at the first storage I.D. for 13 weeks as indicated in the next column of the storage sequences 501. At this point the data would be moved to a second storage I.D. 005 where it would be stored for a duration of 26 weeks. After 26 weeks, the data would be moved to a third storage I.D. 002 for a duration of 52 weeks. This process would continue until the data is stored in an Nth storage I.D. 004. The primary storage sequence 602, of course, is an exemplary storage sequence, but is explained here to assist in understanding operations of all the illustrated storage sequences 501.

As can be seen from FIG. 6, the other storage sequences operate in similar manners. For example, the secondary storage sequence 604 provides data with a storage track that begins at a storage having an I.D. of 005. The data is stored at storage I.D. 005 for 13 weeks as indicated in column 3 of FIG. 6 before moving to a second storage having an I.D. of 003 where the data is stored for 13 weeks. The data is then moved to a storage having I.D. 002 where it is stored for 65 weeks and then moved to storage I.D. 004. The long term storage sequence 608 begins at storage I.D. 005 for 2 weeks, moves to storage I.D. 002 for 12 weeks and then to storage I.D. 004 for permanent storage.

Of particular note is the duplicate storage sequence 606. In the duplicate storage sequence 606, data is received at the analysis engine 316 where it is determined that the data should be copied to two separate storage locations, which are represented in the first storage I.D. column as 001 and 005. The 001 storage I.D. has been directed to store the data for 13 weeks, and then the data may be deleted. The data in the storage having I.D. 005 is directed to be stored for 39 weeks where it will then be moved to a second storage I.D. of 002 for a duration of 46 weeks, after which it will be moved to the nth storage I.D. 004.

Figure 7:
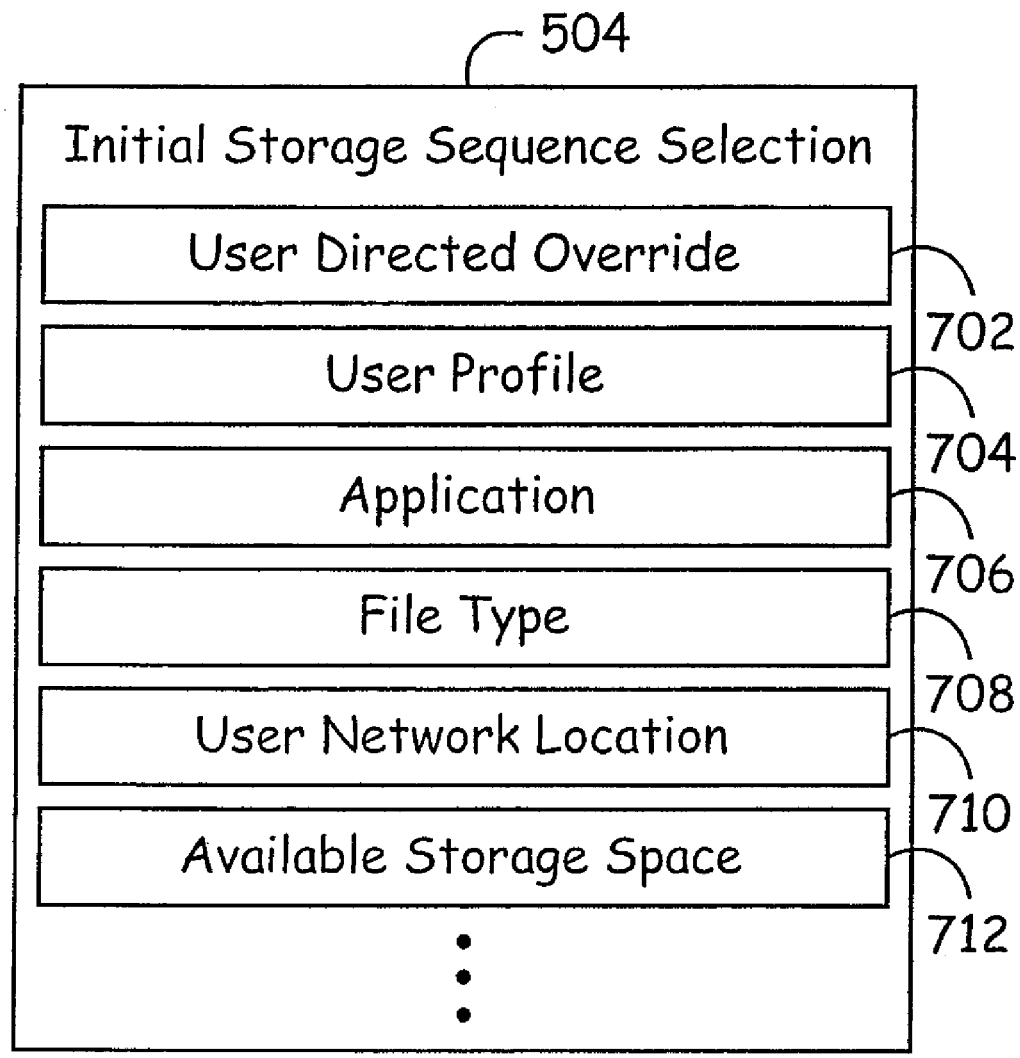
FIG. 7 is a block diagram of the initial storage sequence selection of FIG. 5.

FIG. 7 is a block diagram of the initial storage sequence selection 504. The initial storage sequence selection 504 is comprised of a number of elements that may be used to determine which of the storage sequences 501 that will be used to store the current data. A default initial storage sequence selection is selected for the computer system 300, and the default is comprised of a particular arrangement of factors such as a user directed override 702, a user profile 704, an application 706, a file type 708, a user network location 710, an available storage space 712, . . . . The user directed override 702 represents the situation where a user chooses to implement a particular storage sequence rather than the default storage sequence that would be used if the default storage policies were used. The user profile 704 represents logic that would decide which storage sequence to use based on the type of user, e.g., if the user is a manager, a certain storage sequence would be used, whereas a secretary may require a modified storage sequence. The application 706 that the data is generated from could also play a factor in selecting which storage sequence to use, e.g., if the data was generated from a word processing application, one storage sequence could be selected, whereas if a video application generated the data, a different storage sequence could be selected. The file type 708 is commonly the most important factor in determining which storage sequence to use for the data that is received at the analysis engine 316. The user network location 710 could play a factor in which storage sequence to use, e.g., if the user is located near a particular storage device, one storage sequence may be desired over another storage sequence. The available storage space 712 could affect where data is to be stored when the default storage sequence requires that a decision be made concerning whether data is stored in a storage space that is reaching capacity or in another storage space where extra space is available.

Figure 8:
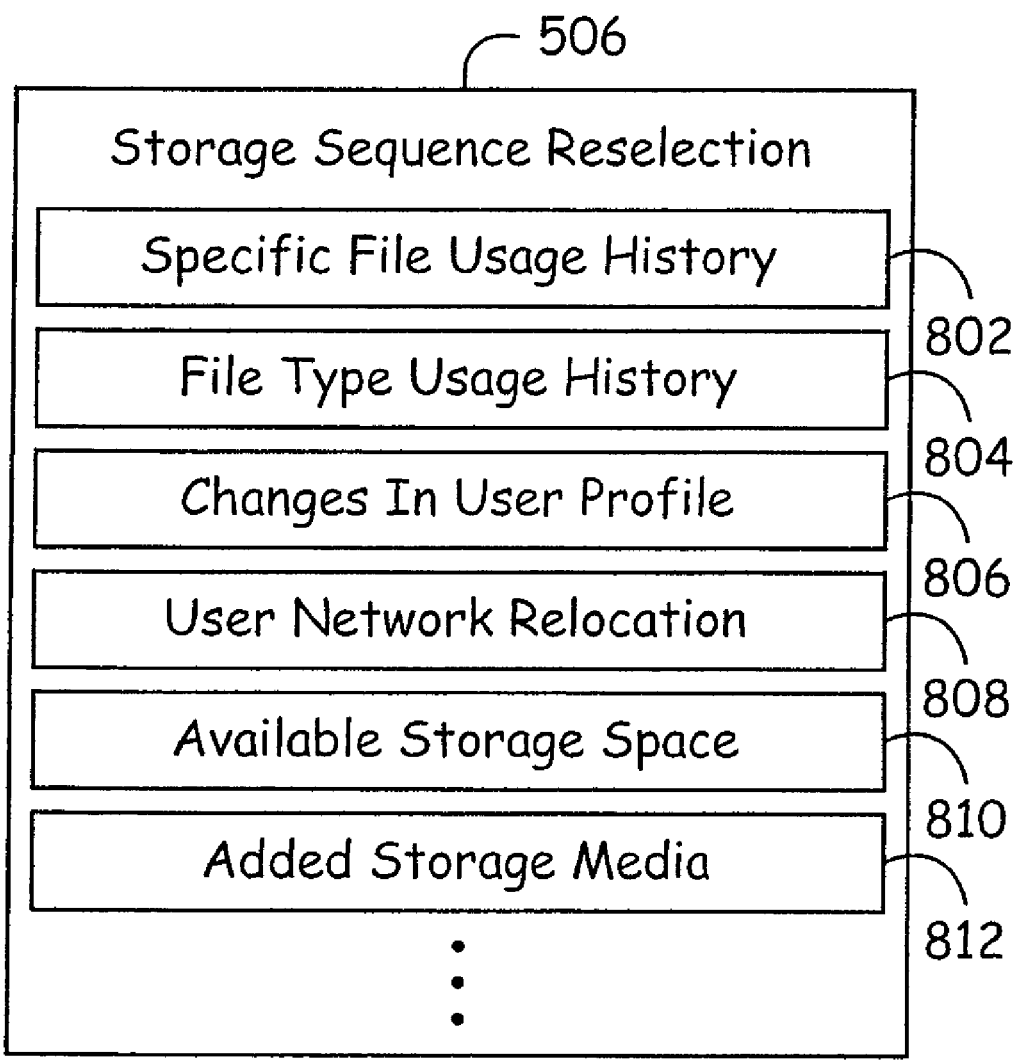
FIG. 8 is a block diagram of the storage sequence reselection of FIG. 5.

FIG. 8 is a block diagram of the storage sequence reselection 506. The storage sequence reselection 506 represents the factors that would be pertinent to selecting a new storage sequence for storage of data in the computer system 300. For example, if specific file usage history 802 shows that the data should be stored in a different storage sequence, the storage sequence reselection 506 allows the new selection of a storage sequence. The file type usage history 804, e.g., the access history of word documents, is another factor which may require a new storage sequence to be used in the computer system 300. Changes in user profile 806 are another reason for changing the storage sequences of the default system. Another factor for changing the default storage sequences is user network relocation 808. Still other factors include the available storage space 810 and added storage media 812. Of course, these are only exemplary factors and additional factors could be added to the storage sequence reselection 506.

Figure 9:
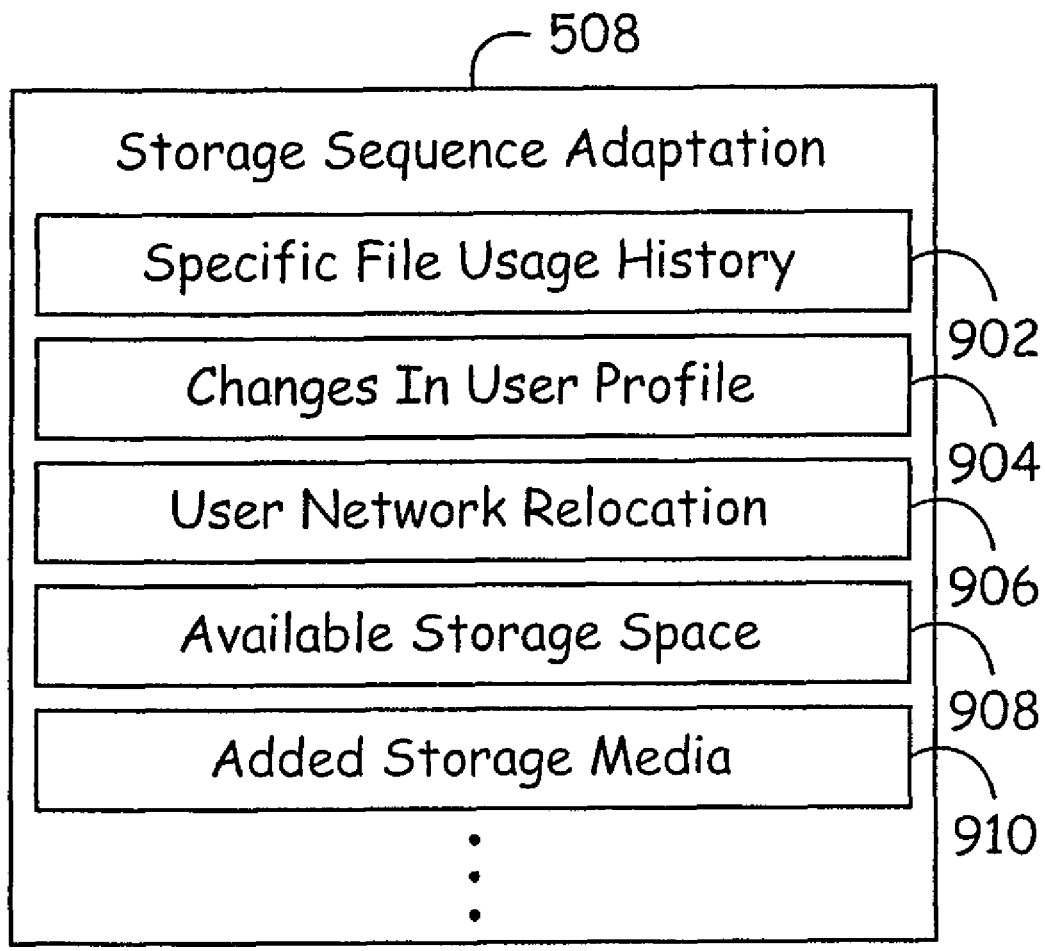
FIG. 9 is a block diagram of the storage sequence adaptation of FIG. 5.

FIG. 9 is a block diagram of the storage sequence adaptation 508. Like the storage sequence reselection 506, the storage sequence adaptation 508 is illustrated having exemplary reasons for adapting the storage sequences that are used in the analysis engine 316. A specific file usage history 902 could be a reason for changing a storage sequence, such as the primary storage sequence 602 having a greater duration for the first storage I.D. Changes in user profile 904 can also be a reason to adapt the storage sequences. Other factors for changing the storage sequences include user network relocation 906, available storage space 908, and added storage media 910.

Figure 10:
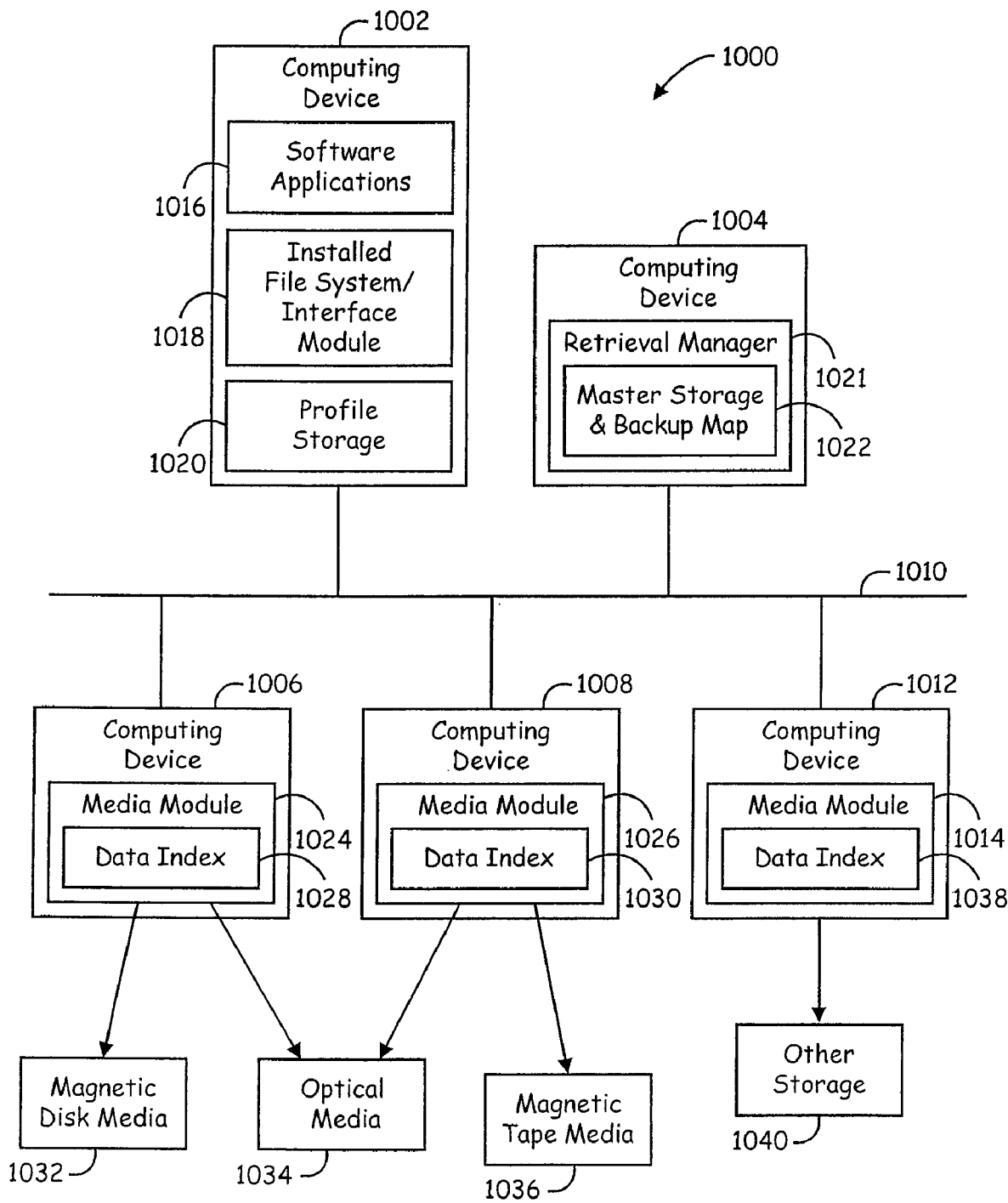
FIG. 10 illustrates an exemplary embodiment of a data and storage management system that operates according to principles of the present invention.

FIG. 10 illustrates an exemplary embodiment of a data and storage management system 1000. The data and storage management system 1000 includes computing devices 1002, 1004, 1006, and 1008 which interact across a network 1010, such as an Ethernet network. A computing device 1012 is also available to interact with the computing devices 1002-1008. The computing device 1012 includes a media module 1014 that includes the capacity to store and retrieve application profiles to the data and storage management system 1000 as described in further detail below.

When the data and storage management system 1000 is in operation, a software application 1016 on the computing device 1002 is used to interact with a word processing document, an engineering graphics file, or similar file (herein referred to as a "file") depending on the type of the software application 1016. Installed file system/interface module 1018 interacts with a profile storage 1020 of the computing device 1002. As will be understood by those of ordinary skill in the art and viewing the present disclosure, the profile storage

1020 could be located on the computing device 1004, 1012, or other computing device to realize various aspects of the present invention.

The computing device 1004 includes a retrieval manager 1021 with a master storage and backup map 1022 that directs requests for a file to one of the computing devices 1006 and 1008. At the computing devices 1006 and 1008, respective media modules 1024 and 1026 exist to help the retrieval request know where the desired file with its accompanying profile (herein referred to as the "information") is located. For further assistance in locating the desired information, the media module 1024 and 1026 include respective data indexes 1028 and 1030. In this manner, the software application 1016 is able to request information and the file of the information is retrieved from one of the storage media, i.e., magnetic disk media 1032, optical media 1034, or magnetic tape media 1036. Due to the storage and retrieval organization, the accompanying profile of is the file in the requested information is retrieved from its location concurrently and typically faster than the retrieval of the file itself.

Of course, the storage media illustrated in FIG. 10 is exemplary storage media and additional storage media could be used while the data management scheme is continually tracked by the media modules 1024 and 1026 of the data and storage management system 1000. The media module 1014 may also include a data index 1038 that provides access to other storage 1040 for a requested file while the accompanying profile is located elsewhere such as the profile storage 1020.

Figure 11:
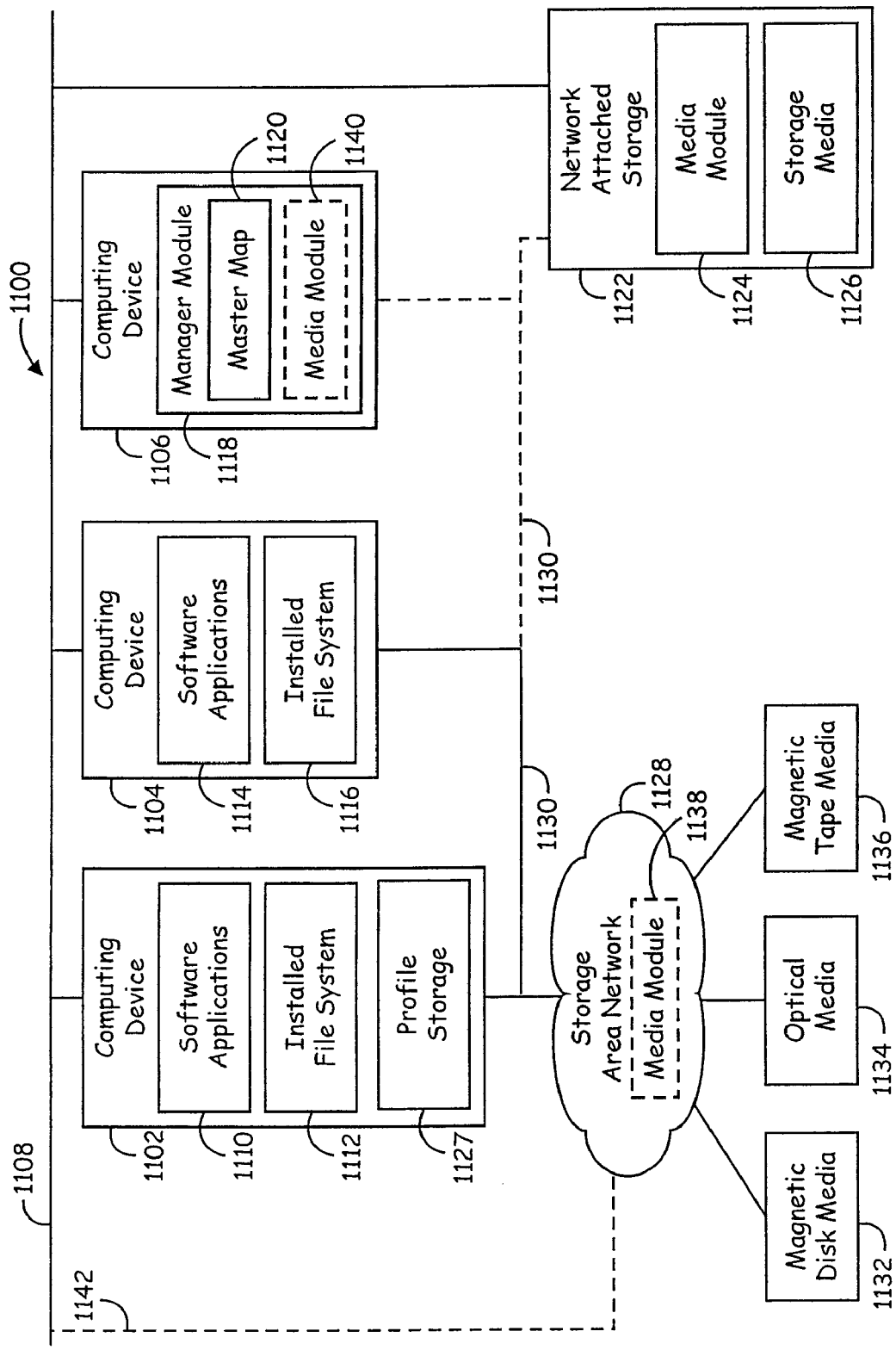
FIG. 11 illustrates an exemplary embodiment of a data and storage management system that operates according to principles of the present invention.

FIG. 11 illustrates an exemplary embodiment of a data and storage management system 1100. The data and storage management system 1100 includes computing devices 1102, 1104, and 1106 which communicate across a network 1108, such as an Ethernet network. A software application 1110 is illustrated in the computing device 1102 and may request to view a file such as a word processing document, graphics program document, or other type of file with its accompanying profile through an installed file system 1112. Similarly, a software application 1114 operates on the computing device 1104 and interacts with an installed file system 1116. The computing devices 1102 and 1104 commonly interact with the computing device 1106 across the network 1108 where a manager module 1118 is accessed and a master map 1120 is available to retrieve more detailed information on the location of messages in the data and storage management system 1100. If the software application 1110 has requested a file, the installed file system 1112 may interact with a network attached storage 1122 where a media module 1124 interacts with storage media 1126 to retrieve the desired file that was requested by the software application 1110. A profile storage 1127 in the computing device 1102 contains profiles of the files that are stored and when the file is retrieved from the storage media 1126, its corresponding profile may be retrieved from the profile storage 1127.

Alternatively, the installed file system 1112 may interact with a storage area network 1128 across a network 1130, the network 1130 commonly being a high speed fibre network. The storage area network 1128 makes accessing storage media such as magnetic disk media 1132, optical media 1134, and magnetic tape media 1136 available without significant processing in the computing device 1102. To find the exact location of a file, a media module 1138 (shown in dashed lines to represent the optional nature of its location within the storage area network 1128) may be used to locate the file. In addition, a media module 1140 shown in dashed lines may be available to find the exact location of a file. Also shown in dashed lines is an extension of the network 1130 where the network attached storage 1122 may include a high speed connection with the computing devices 1102, 1104, and 1106. Finally, the storage area network 1128 may communicate directly with the network 1108 as indicated by dashed lines 1142.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." As used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended, such an intent will be explicitly recited in the claim, and in the absence of such recitation no such limitation is present or intended. For example, in the claims below, when a claim element is described as having "one" feature, it is intended that that element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that that element not be limited to one and only one of the feature described. Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

The above-listed sections and included information are not exhaustive and are only exemplary for an application specific rollback system according to principles of the present invention. The particular sections and included information in a particular embodiment may depend upon the particular implementation and the included devices and resources. Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

The invention claimed is:

1. An application specific profile storage and retrieval system for a computer system, wherein the computer system includes a software application that creates a version of a file and a corresponding application specific profile associated with the file version, the system comprising:
    multiple storage media; and
    at least one storage management module, wherein the at least one storage management module is configured to manage storage of application specific profiles and configured to manage storage of corresponding files among the multiple storage media, wherein the at least one storage management module stores the application specific profiles at separate locations from the corresponding files and wherein an application specific profile may be retrieved separately from a corresponding file;
    a processor for operating the software application in the computer system;
    wherein the software application provides for storage and retrieval of the file and the corresponding application specific profile wherein the corresponding application specific profile is used by the software application for at least a purpose of preparing the software application to display the file upon its retrieval by the software application;
    wherein the multiple storage media are communicatively coupled to the processor; and
    wherein the at least one storage management module distributes stored files and corresponding profiles among the multiple storage media according to predetermined patterns, wherein at least one of the predetermined patterns includes storing of a file at a separate location from its corresponding application specific profile.

2. The application specific profile storage and retrieval system of claim 1 wherein at least one of the multiple storage media is located locally.

3. The application specific profile storage and retrieval system of claim 1 wherein at least one of the multiple storage media is located remotely.

4. The application specific profile storage and retrieval system of claim 1 wherein the at least one storage management module distributes stored files and corresponding profiles among the multiple storage media according to predetermined patterns, and wherein at least one of the predetermined patterns enables retrieval of the file's corresponding application specific profile before retrieval of the file by the software application.

5. The application specific profile storage and retrieval system of claim 1 wherein the application specific profiles that are stored among the multiple storage media comprise different application specific profiles for different versions of a corresponding file.

6. The application specific profile storage and retrieval system of claim 1 wherein the at least one storage management module provides concurrent access of the application specific profile and the file.

7. The application specific profile storage and retrieval system of claim 1 wherein the application specific profile is retrieved prior to the file and sets up the software application in preparation for receipt of the file.

8. The application specific profile storage and retrieval system of claim 1 wherein the at least one storage management module is further configured to retrieve the application specific profile before the corresponding file.

9. A method for storage and retrieval in a computer system comprising:
    creating multiple versions of a file using a software application;
    creating an application specific profile corresponding to a version of the file, wherein the application specific profile is used by the software application for at least the purpose of preparing the software application to display the file upon its retrieval by the software application, a new profile being created at least each time the file is saved;
    sending the file, with the software application, to a storage management module that manages storage of the file and storage of the application specific profile;
    storing the file and the application specific profile to separate storage locations in the computer system;
    requesting for the retrieval of the file with the software application such that the storage management module retrieves the file and the application specific profile as though the file and its application specific profile were located in a single location; and
    formatting the software application in accordance with the retrieved application specific profile prior to display of the file with the software application.

10. The method of claim 9 wherein the software application is selected from the group consisting of a word processor, an engineering graphics program, a standard graphics program, a database, and a web browser.

11. The method of claim 9 wherein a different profile is stored with the storage of each version of the file as the file is created.

12. The method of claim 9 wherein the storage management module distributes different files and file versions in a first set of storage media and stores different application specific profiles for each of the files and versions of the files in a second set of storage media.

13. A system for storage and retrieval in a computer system comprising:
    means for creating multiple versions of a file using a software application;
    means for creating an application specific profile corresponding to a version of the file, wherein the application specific profile is used by the software application for at least the purpose of preparing the software application to display the file upon its retrieval by the software application, wherein a new profile is created at least each time the file is saved;
    means for sending the file, with the software application, to storage management means for managing storage of the file and storage of the application specific profile;
    means for storing the file and the application specific profile to separate storage locations in the computer system;

means for requesting for the retrieval of the file with the software application such that the storage management means retrieves the file and the application specific profile as though the file and its application specific profile were located in a single location; and means for formatting the software application in accordance with the retrieved application specific profile prior to display of the file with the software application.

* * * * *

UNITED STATES PATENT AND TRADEMARK OFFICE
CERTIFICATE OF CORRECTION

PATENT NO. : 7,937,702 B2  Page 1 of 1
APPLICATION NO. : 12/200666
DATED : May 3, 2011
INVENTOR(S) : Randy De Meno et al.

It is certified that error appears in the above-identified patent and that said Letters Patent is hereby corrected as shown below:

IN THE SPECIFICATIONS:

In column 9, line 18, after "of" delete "is".

Signed and Sealed this
Ninth Day of August, 2011

David J. Kappos
*Director of the United States Patent and Trademark Office*